US006999210B2

(12) United States Patent
Uchida

(10) Patent No.: US 6,999,210 B2
(45) Date of Patent: Feb. 14, 2006

(54) ORIGINAL READER

(75) Inventor: Toru Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 851 days.

(21) Appl. No.: 09/983,917

(22) Filed: Oct. 26, 2001

(65) Prior Publication Data
US 2002/0054388 A1 May 9, 2002

(30) Foreign Application Priority Data
Nov. 2, 2000 (JP) ............................. 2000-335559

(51) Int. Cl.
H04N 1/04 (2006.01)
(52) U.S. Cl. .................... 358/475; 474/497; 474/483
(58) Field of Classification Search ............... 358/475, 358/509, 487, 506, 496, 497, 494, 474, 484, 358/408, 482, 483; 250/234–236, 208.1, 250/216, 559.11; 362/260, 217, 223, 232, 362/307, 311, 257, 551, 263, 296, 297
See application file for complete search history.

(56) References Cited
U.S. PATENT DOCUMENTS
6,023,250 A * 2/2000 Cronyn ..................... 343/895
6,224,237 B1 * 5/2001 Wilson ....................... 362/223
6,299,328 B1 * 10/2001 Wilson ....................... 362/223
6,550,942 B1 * 4/2003 Zou et al. ................... 362/347
6,842,270 B2 * 1/2005 Tsuji .......................... 358/487
6,867,536 B2 * 3/2005 Srivastava et al. .......... 313/487

FOREIGN PATENT DOCUMENTS
| JP | 03-225745 | | 10/1991 |
| JP | 05-207229 | A | 8/1993 |
| JP | 09-284483 | | 10/1997 |
| JP | 10-4473 | A | 1/1998 |
| JP | 10-79835 | | 3/1998 |
| JP | 10-79835 | A | 3/1998 |
| JP | 11-44918 | A | 2/1999 |
| JP | 2000-115470 | A | 4/2000 |

* cited by examiner

Primary Examiner—Cheukfan Lee
(74) Attorney, Agent, or Firm—Sughrue Mion, PLLC

(57) ABSTRACT

An illuminant for converting ultraviolet rays directly radiated outside from an opening of a glass tube into visible light is disposed outside a light source. The light source and the illuminant are disposed in approximately symmetrical positions sandwiching a vertical surface orthogonal to a moving direction of the light source, that is, a direction of Y and including an original reading position.

4 Claims, 7 Drawing Sheets

ORIGINAL READER

BACKGROUND OF THE INVENTION

1. Field of the Invention

The present invention relates to an original reader suitably used for a digital copier, a facsimile, an image scanner and so on, and more particularly to a scanning type original reader designed to read an image for each line of an original image.

2. Description of the Related Art

A variety of scanning type original readers designed to read an image for each line of an original image (e.g., Japanese Patent Laid-Open Nos. 9-284483, 10-79835, and so on) have heretofore been proposed.

FIG. 11 is a schematic view showing a conventional typical original reader; and FIG. 12 is a view showing a peripheral portion of a light source. This original reader comprises an imaging optical system, which includes a light source 1, a reflecting plate 2, mirrors 3a, 3b and 3c, and an imaging lens 4. By this imaging optical system, an original image of an original 6 set in an original reading position 5 is formed on a light-receiving surface of a line sensor (CCD) 7, and then the original image is read.

For the light source 1, a xenon lamp is generally used. The xenon lamp is constructed in such a manner that phosphor 8 is coated on a part of the inner wall surface of a glass tube 1A, rare gas mainly containing xenon gas is sealed in the tube, and a pair of strip electrodes (not shown) are provided in the outer wall of the glass tube 1A; and the lamp is lit by applying high-frequency voltages to the electrodes (Japanese Patent Laid-Open No. 3-225745 or the like).

The light source 1, the reflecting plate 2 and the mirror 3a are united to constitute a first mirror unit 9. Similarly, the mirrors 3b and 3c are united to constitute a second mirror unit 10. The first and second mirror units 9 and 10 are supported by a driving motor, a timing belt, and so on, not shown, so as to be freely moved in a direction parallel to a glass plate 11, that is, a direction of an arrow Y.

When the original reader reads the original 6 placed on the glass plate 11, the light source 1 is lit to irradiate the original reading position 5. In this case, ultraviolet rays 20 radiated from the light source 1 into the tube are converted into visible light 13 by the phosphor 8. After the visible light is radiated outside from an opening 1B of the glass tube 1A, the original reading position 5 is directly irradiated with a part of the visible light, and another part thereof is reflected by the reflecting plate 2 to irradiate the original reading position 5. In addition, the first and second mirror units 9 and 10 are simultaneously moved to the left in the drawing. In this case, in order to maintain a length of an optical path from the original reading position 5 to the line sensor 7 constant, a moving speed of the second mirror unit 10 is set to be half of that of the first mirror unit 9, and the second mirror unit 10 is moved by a distance half of a moving distance of the first mirror unit 9. Accordingly, the original reading position 5 is moved to the left by an amount equal to the moving amount of the first mirror unit 9, thereby forming an image of a new original reading position on the line sensor 7. As a result, by scanning the first mirror unit 9 only by an amount equal to the length of the original 6, it is possible to read the image of the entire original 6.

For the reflecting plate 2, an aluminum plate or the like, usually mirror finished, is used. By optimizing an opening angle A of the opening 1B of the light source 1, a direction X of the opening 1B, a sectional shape of the reflecting plate 2, and a position of the reflecting plate 2, illuminance at the original reading position 5 can be increased by about 1.5 times compared with the case of no reflecting plates 2 present.

FIG. 13 shows a peripheral portion of a light source of an original reader disclosed in the foregoing Japanese Patent Laid-Open No. 10-79835.

The original reader disclosed therein is designed to increase illumination efficiency and to reduce ultraviolet rays 20a harmful to the sensor in the following manner: the ultraviolet rays 20a radiated from the light source 1 and directly radiated outside of the glass tube 1A from the opening 1B of the light source 1 without being directed to the phosphor 8, are converted into visible light 13a by an illuminant 21 disposed outside the light source 1, and the original reading position 5 is irradiated with the visible light.

As described above, according to the conventional original reader shown in FIG. 13, the increase in illumination efficiency and the reduction in the ultraviolet rays 20a harmful to the sensor can be simultaneously achieved by converting the ultraviolet rays 20a directly radiated outside from the opening 1B of the light source 1, which are not directly usable for reading, into the visible light 13a by the illuminant 21. Thus, this original reader may be more advantageous than the conventional reader using the reflecting plate 2 shown in FIG. 11 and FIG. 12. However, since the illuminant 21 is disposed between the light source 1 and the glass plate 11, the light source 1 is located away from the original reading position 5, making it impossible to obtain a sufficient illumination effect. Thus, rather the conventional reader using the reflecting plate 2 shown in FIG. 12 may be more advantageous in terms of the illumination effect. However, since the reflecting plate 2 is provided without functions to convert the ultraviolet rays 20a into the visible light 13a, resulting in exerting a greater influence on the sensor, the use of the reader using the reflecting plate 2 is not recommended.

SUMMARY OF THE INVENTION

The present invention was made to solve the foregoing problems inherent in the conventional art, and it is an object of the present invention to provide an original reader designed to enhance an illumination effect.

In order to achieve the foregoing object, in accordance with a first aspect of the invention, an original reader is provided, comprising: a light source for irradiating an original reading position; and an illuminant for converting ultraviolet rays directly radiated outside from an opening of the light source into visible light, wherein the light source and the illuminant are disposed in approximately symmetrical positions sandwiching a vertical surface orthogonal to a moving direction of the light source and including the original reading position.

In a second aspect of the invention, according to the foregoing first aspect of the invention, the illuminant is formed in a reflecting plate.

In accordance with a third aspect of the invention, an original reader is provided, comprising: a light source for irradiating an original reading position; an illuminant for converting ultraviolet rays directly radiated outside from an opening of the light source into visible light; and a reflecting plate for reflecting light emitted from the light source and for guiding the light to the original reading position, wherein the light source and the reflecting plate are disposed in approximately symmetrical positions sandwiching a vertical surface orthogonal to a moving direction of the light source and including the original reading position, and the illuminant is disposed on a side opposite to the original reading position sandwiching the light source.

In a fourth aspect of the invention, according to the foregoing third aspect of the invention, another illuminant different from the illuminant placed oppositely to the original reading position sandwiching the light source is provided in a surface opposite to an original in an outer surface of a tube wall of the light source.

In accordance with a fifth aspect of the invention, an original reader is provided, comprising: a light source for irradiating an original reading position; an illuminant for converting ultraviolet rays directly radiated outside from an opening of the light source into visible light; and a reflecting plate for reflecting light emitted from the light source and for guiding the light to the original reading position, wherein the light source and the reflecting plate are disposed in approximately symmetrical positions sandwiching a vertical surface orthogonal to a moving direction of the light source and including the original reading position; and the illuminant is made of a light-transmissive material and provided in a backside of a glass plate on which an original is placed.

In accordance with the first aspect of the invention, since the light source and the illuminant are disposed approximately opposite to each other in the moving direction of the light source sandwiching the surface vertical to the original reading position, the light source can be disposed close to the original. In addition, the illuminant converts the ultraviolet rays directly radiated outside from the light source into the visible light, thus enhancing an illumination effect and simultaneously reducing the ultraviolet rays harmful to a sensor.

Furthermore, the presence of the reflecting plate provides bright illumination to the original reading position.

DETAILED DESCRIPTION OF THE PREFERRED EMBODIMENTS

Hereinafter, the preferred embodiments of the present invention will be described in detail with reference to the accompanying drawings.

Figure 1:
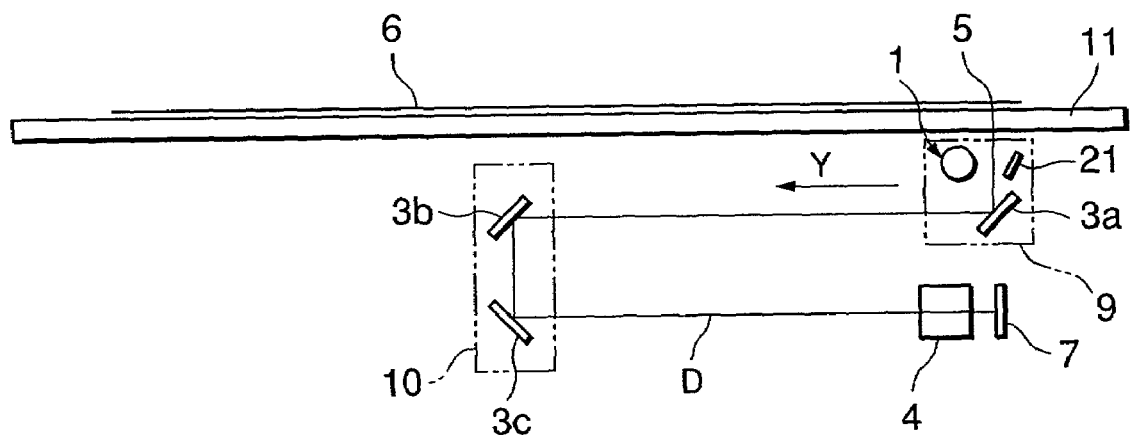
FIG. 1 is a constitutional view schematically showing an original reader according to a first embodiment of the present invention.
Figure 2:
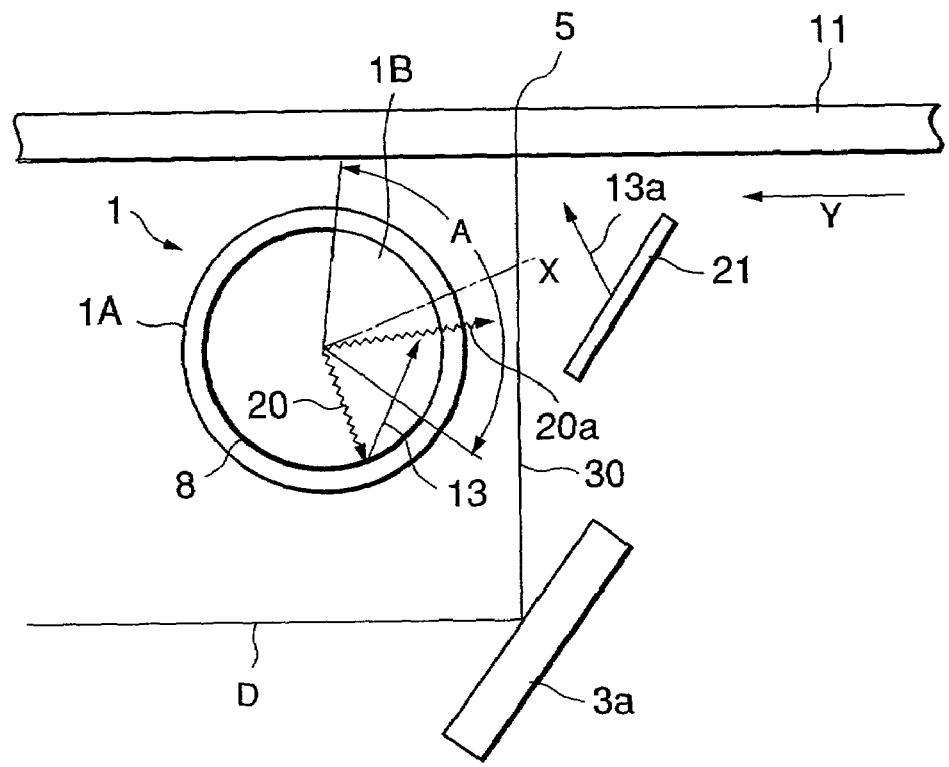
FIG. 2 is a sectional view of a peripheral portion of a light source shown in FIG. 1.

FIG. 1 is a constitutional view schematically showing an original reader according to a first embodiment of the present invention; and FIG. 2 is a sectional view showing a peripheral portion of a light source. As shown in these drawings, the original reader comprises an imaging optical system, which includes a light source 1, mirrors 3a, 3b and 3c, an imaging lens 4, and an illuminant 21. By the imaging optical system, an original image of an original 6 in an original reading position 5 is formed on a light-receiving surface of a line sensor (CCD) 7, and then the original image is read.

For the light source 1, for example, a tube surface electrode xenon lamp is used. Specifically, a phosphor 8 is coated on a part of the inner wall surface of a glass tube 1A, rare gas mainly containing xenon gas is sealed in the tube, and a pair of strip electrodes (not shown) are provided in the outer wall of the glass tube 1A. The xenon lamp is lit by applying high-frequency voltages to the electrodes. For the phosphor 8, one is selected to be used from calcium halophosphate, zinc silicate, calcium tungstate, cadmium borate, magnesium tungstate, and so on. By the phosphor 8, ultraviolet rays 20 generated by the lighting of the light source 1 in the glass tube 1A are converted into visible light 13. To allow the phosphor 8 to emit light, high-frequency voltages are applied to the strip electrodes, electrons of the rare gas in the glass tube 1A are excited to temporarily increase an energy level, and the ultraviolet rays 20 discharged as an extra energy when the high energy level is returned to the original low energy level are used. In other words, the phosphor 8 is made to emit light by the ultraviolet rays 20 generated in the tube, and converts the ultraviolet rays 20 into the visible light 13. A center angle A of an opening 1B of the glass tube 1A is set at, for example, 120°, and its direction X (a direction bisecting the center angle of the opening 1B) is directed to the position where the illuminant 21 is disposed.

The illuminant 21 is provided to convert ultraviolet rays 20a, generated by the lighting of the light source 1 and directly radiated outside prom the opening 1B of the glass tube 1A, into visible light 13a. This illuminant 21 is made of a material similar to that for the phosphor 8. In addition, the illuminant 21 is disposed in a position approximately symmetrical to the light source 1 sandwiching a surface 30 vertical to the original reading position 5, in a moving direction of the light source 1, that is, a direction of an arrow Y. In other words, the illuminant 21 is disposed oppositely to the light source 1 in the moving direction of the light source 1. Accordingly, no obstacles are present between the light source 1 and a glass plate 11, a thus the light source 1 can be disposed close to the original 6.

The light source 1, the mirror 3a and the illuminant 21 are united to constitute a first mirror unit 9. Similarly, the mirrors 3b and 3c are united to constitute a second mirror unit 10. The first and second mirror units 9 and 10 are supported by a driving motor, a timing belt, and so on, not shown, so as to be freely moved in a direction parallel to the glass plate 11, that is, a direction of an arrow Y.

When the original reader reads the original 6 placed on the glass plate 11, the light source 1 is lit to irradiate the original reading position 5. In this case, the ultraviolet rays 20 in the glass tube 1A are converted into the visible light 13 by the phosphor 8. A part of the visible light 13 is radiated outside from the opening 1B of the glass tube 1A to directly irradiate the original reading position 5. A part of the ultraviolet rays 20a generated in the light source 1 and directly radiated outside from the opening 1B of the glass tube 1A is made incident onto the illuminant 21, and converted into the visible light 13a, and the original reading position 5 is irradiated with the visible light 13a.

While the light source 1 is lit, the first mirror unit 9 is moved in the direction of the arrow Y, and simultaneously the second mirror unit 10 is moved in the same arrow direction Y by a distance half of a moving distance of the first mirror unit 9. In addition, a moving speed of the second mirror unit 10 is set to be half of a moving speed of the first mirror unit 9, and a length D of an optical path from the original reading position 5 to the line sensor 7 is maintained constant. Accordingly, the original reading position 5 is moved in the direction of the arrow Y by an amount equal to the moving amount of the first mirror unit 9, and an image of a new original reading position is formed on the line sensor 7. As a result, by scanning the first mirror unit 9 only by an amount equal to the length of the original 6, it is possible to read an image of the entire original 6. As a matter of course, it is desirable that the direction X of the opening 1B, the size of the opening 1B, the size of the illuminant 21, the shape thereof, and so on, are set to be optimal based on experiments or simulations.

Apparently, according to the present invention, since the illuminant 21 is disposed in the position approximately symmetrical to the light source 1 sandwiching the vertical surface 30 orthogonal to the moving direction of the light source 1, that is, the direction of the arrow Y and including the original reading position 5, no obstacles are present between the light source 1 and the glass plate 11, making it possible to dispose the light source 1 close to the glass plate 11. Moreover, since the ultraviolet rays 20a, directly radiated outside from the opening 1B of the light source 1 and not directly used for reading, are converted into the visible light 13a by the illuminant 21 to be used for reading the original 6, not only the original reading position 5 can be illuminated by high illuminance, but also an influence exerted by the ultraviolet rays 20a on the line sensor 7 can be reduced.

Figure 12:
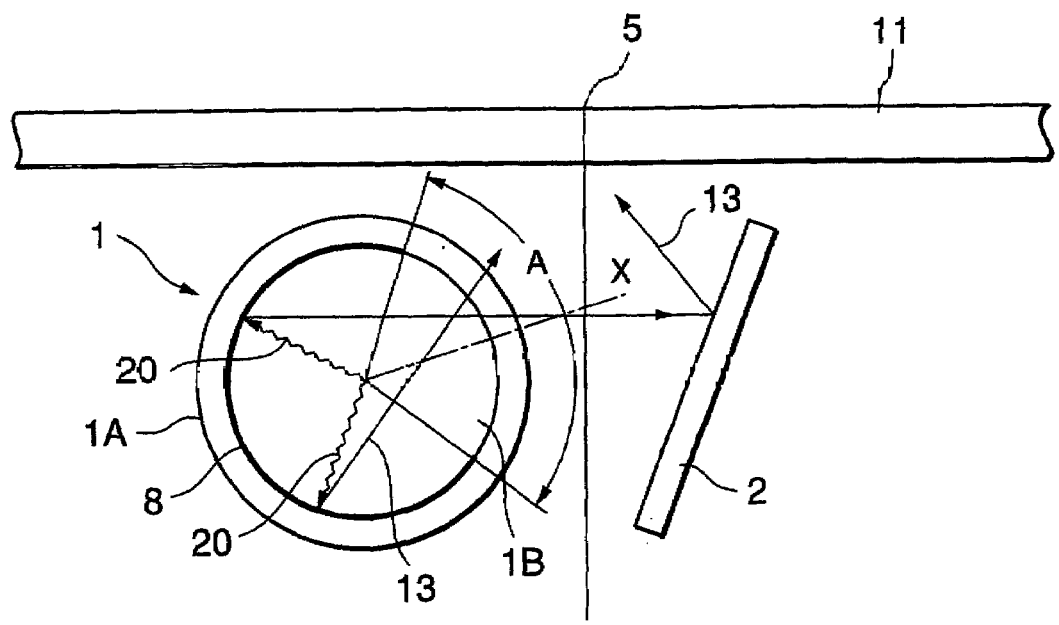
FIG. 12 is a sectional view showing a peripheral portion of a light source.
Figure 13:
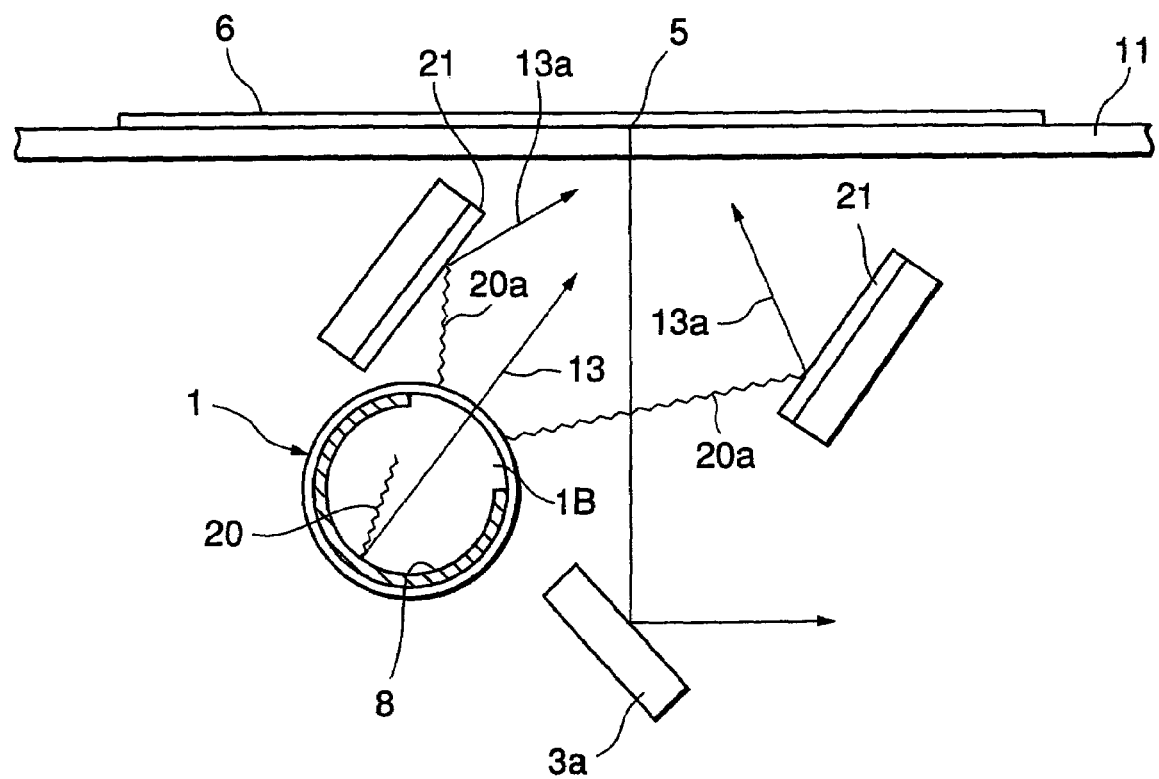
FIG. 13 is a sectional view showing a peripheral portion a light source of another conventional original reader.

As a result, it is possible to increase a reading speed of the original 6, to improve S/N, and to enhance an image quality. Conversely, a smaller light source can be used for obtaining necessary illuminance. In addition, illuminance distribution around the original reading position 5 can be uniformized compared with the case of the conventional original reader using the reflecting plate 2 shown in FIG. 12.

Furthermore, since the line sensor 7 used for a color original reader shows various sensitivities for colors depending on quality thereof, it was usually necessary to match sensitivity with that of the line sensor 7 at the light source 1. According to the present invention, however, selection of a color emitted from the external illuminant 21 enables the most general light source to be employed, thereby reducing costs.

Figure 3:
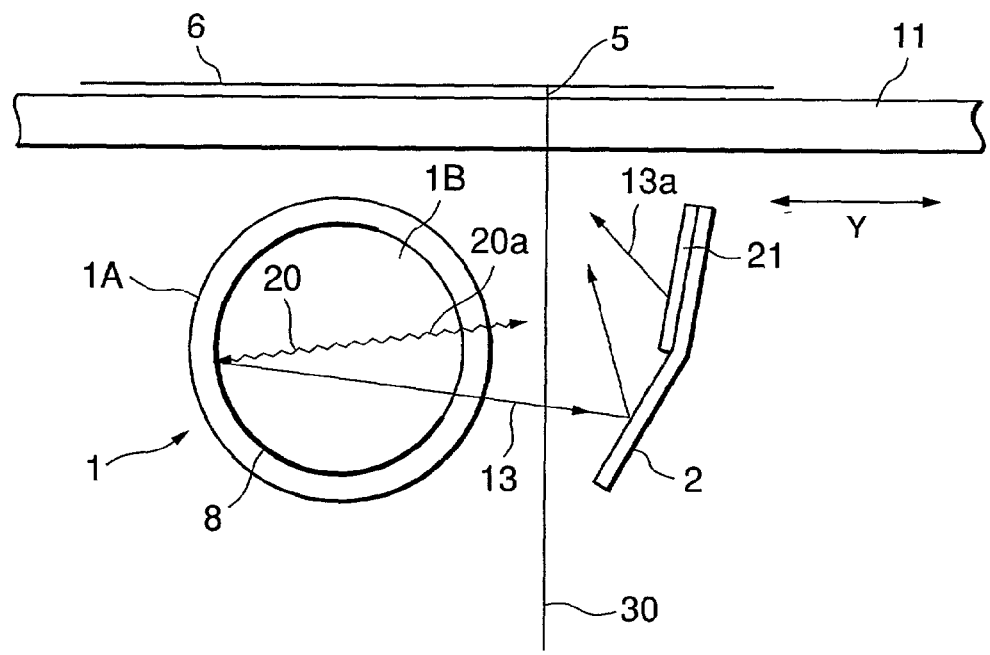
FIG. 3 is a sectional view showing a peripheral portion of a light source according to a second embodiment of the present invention.

FIG. 3 is a sectional view showing a peripheral portion of a light source according to a second embodiment of the present invention.

According to the embodiment, a reflecting plate 2 is disposed in a position approximately symmetrical to a light source 1 sandwiching a vertical surface orthogonal to a moving direction of the light source 1, that is, a direction of an arrow Y and including an original reading position 5; and an illuminant 21 is disposed on an end of a reflecting surface of the reflecting plate 2, which is close to the original. The constitutions other than those described above are similar to the foregoing first embodiment.

With such a constitution, visible light 13 emitted from the light source 1 is reflected by the reflecting plate 2, and the original reading position 5 is irradiated with the reflected light. Simultaneously, ultraviolet rays 20a directly radiated outside from an opening 1B of the light source 1 are converted into visible light 13a by an illuminant 21, and the original reading position 5 is irradiated with the visible light 13a. Thus, compared with the foregoing first embodiment, the original reading position 5 can be illuminated more brightly, enhancing an illumination effect.

Figure 4:
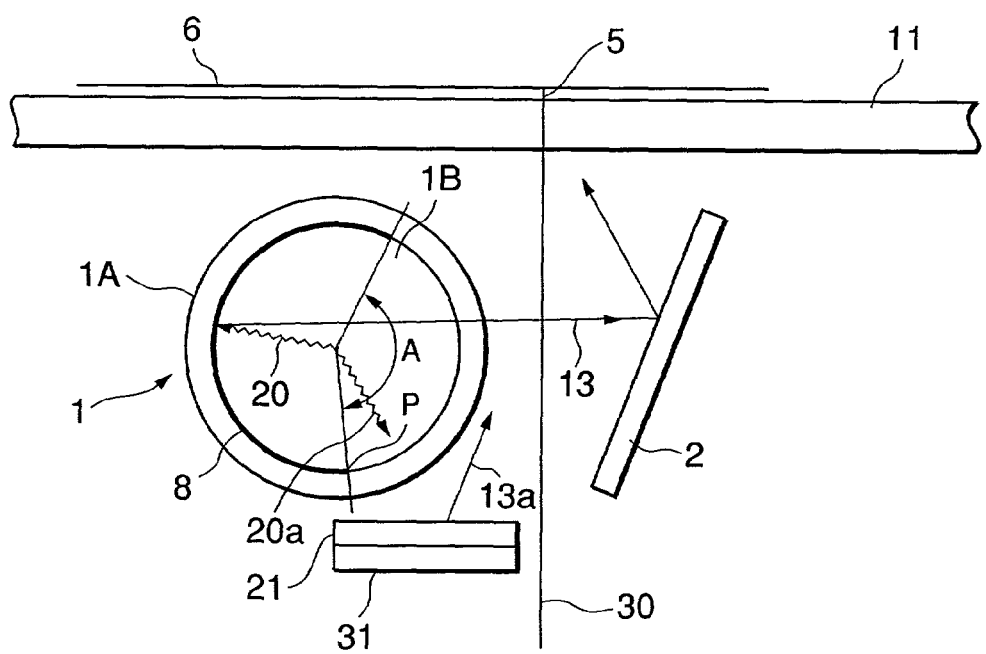
FIG. 4 is a sectional view showing a peripheral portion of a light source according to a third embodiment of the present invention.

FIG. 4 is a sectional view showing a peripheral portion of a light source according to a third embodiment of the present invention.

According to the embodiment, a reflecting plate 31 is disposed below a light source 1, and an illuminant 21 is provided on a surface thereof. In addition, a reflecting plate 2 is disposed in a position approximately symmetrical to the light source 1 sandwiching a vertical surface 30 orthogonal to a moving direction of the light source 1, that is, a direction of an arrow Y and including an original reading position 5. A phosphor 8 formed in an inner wall surface of a glass tube 1A is formed within a range of about 210° extending from a position P to the inner surface opposite to the reflecting plate 2, the position P being slightly shifted from a lowermost end passing through the center of a glass tube 1A to the reflecting plate 2. Accordingly, a center angle A of an opening 1B of the glass tube 1A is about 150°. A reflecting plate 31 is positioned approximately in parallel to a glass plate 11, and the end thereof close to the light source 1 is positioned below the vicinity of the position P. As to the reflecting plate 31, the end thereof opposite to the light source 1 is positioned so as to shift to the left from a position just below the original reading position 5 so that the end of the reflecting plate 31 opposite to the light source 1 does not block an optical path.

With such a constitution, ultraviolet rays 20 generated in the glass tube 1A by the lighting of the light source 1 are converted into visible light 13 by the phosphor 8. This visible light 13 is radiated outside from the opening 1B of the glass tube 1A, the original reading position 5 is directly irradiated with a part of the visible light 13, and another part of the visible light 13 is reflected by the reflecting plate 2 to irradiate the original reading position 5. A part of ultraviolet rays 20a generated in the light source 1 and directly radiated outside from the opening 1B of the glass tube 1A is made incident onto the illuminant 21 to be converted into visible light 13a, and the original reading position 5 is irradiated with the visible light 13a. Thus, according to the embodiment, similarly to the foregoing second embodiment, it is possible to enhance an illumination effect.

Figure 5:
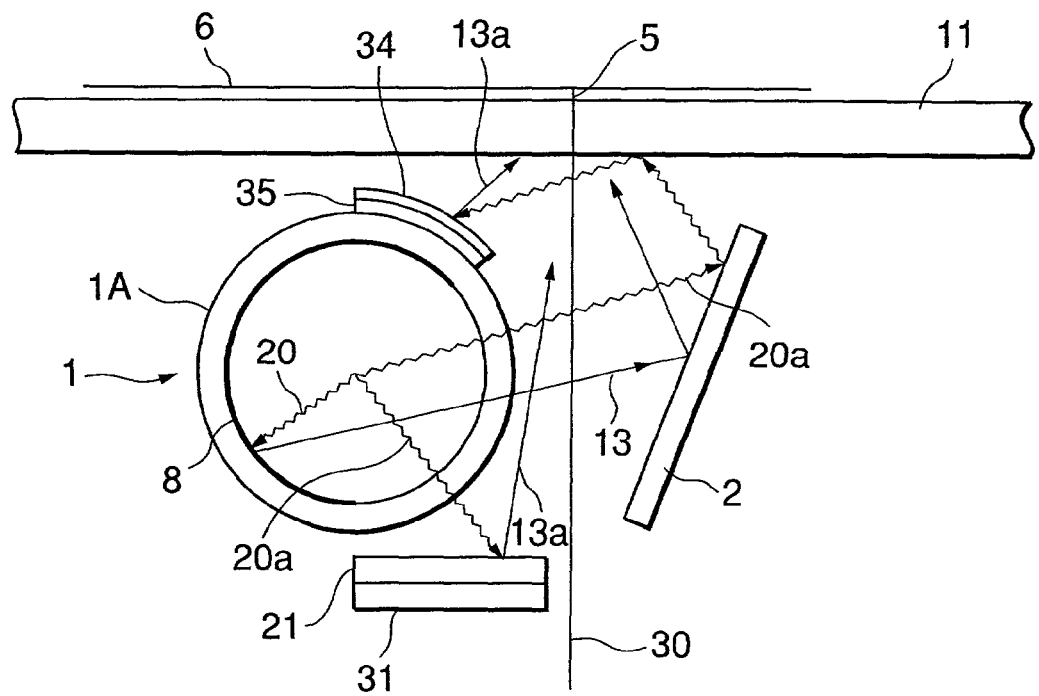
FIG. 5 is a sectional view showing a peripheral portion of a light source according to a fourth embodiment of the present invention.

FIG. 5 is a sectional view showing a peripheral portion of a light source according to a fourth embodiment of the present invention.

According to the embodiment, another illuminant 34 is disposed in an upper surface side of a glass tube 1A. The illuminant 34 is formed on a surface of a strip electrode 35 provided on an outer periphery of the glass tube 1A. The strip electrode 35 functions as a reflecting plate for reflecting visible light 13a converted by the illuminant 34. The constitutions other than those described above are exactly the same as the foregoing third embodiment.

With such a constitution, a part of ultraviolet rays 20a directly radiated outside from an opening 1B of the light source 1 and reflected by a reflecting plate 2 is converted into the visible light 13a by the illuminant 34, and the visible light 13a is reflected by the strip electrode 35 and irradiates an original reading position 5. In addition, another part of the ultraviolet rays 20a is made incident onto the backside of a glass plate 11 to be reflected and converted into the visible light 13a by the illuminant 34; and the visible light 13a is reflected by the strip electrode 35 and irradiates the original reading position 5. Accordingly, compared with the foregoing second and third embodiments, the ultraviolet rays 20a not directly used for reading can be effectively utilized, further enhancing an illumination effect and further reducing the ultraviolet rays 20a harmful to a line sensor.

Figure 6:
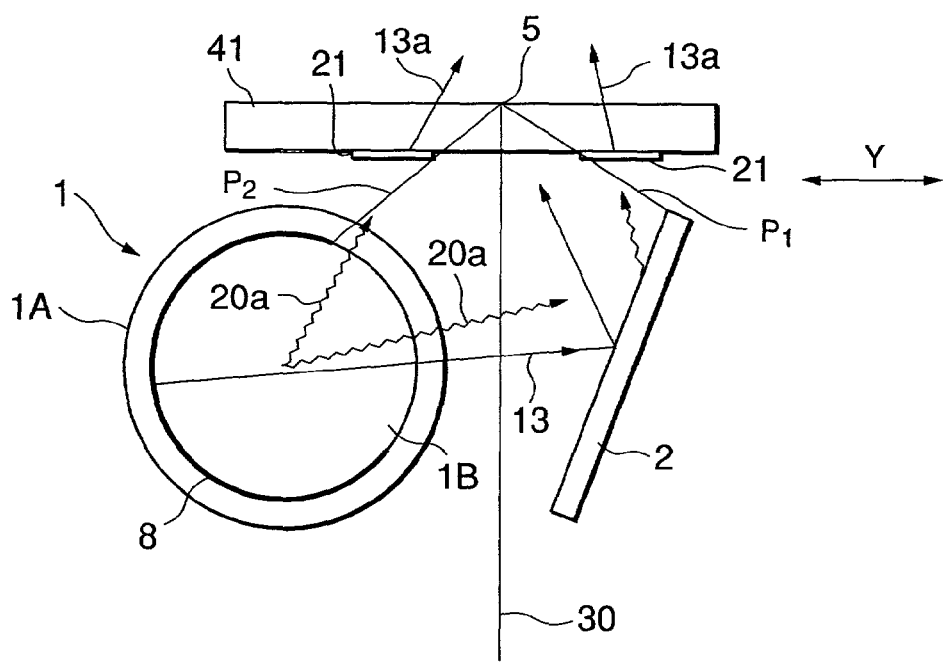
FIG. 6 is a sectional view showing a peripheral portion of a light source according to a fifth embodiment of the present invention.

FIG. 6 is a sectional view showing a peripheral portion of a light source according to a fifth embodiment of the present invention.

Figure 7:
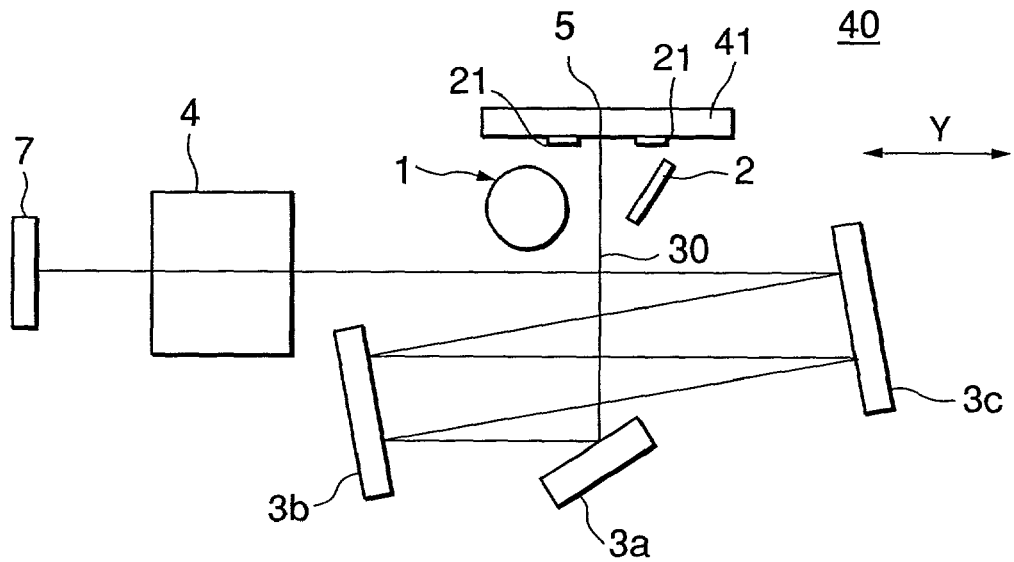
FIG. 7 is a constitutional view schematically showing an example of application of the present invention to a scanner module.

Unlike the foregoing first to fourth embodiments, the fifth embodiment shows an example of the application of the present invention to a scanner module 40, which is shown in FIG. 7. Thus, in the backside of a cover glass (glass plate) 41, two illuminants 21 are disposed approximately symmetrically in both sides thereof sandwiching a vertical surface 30 orthogonal to a moving direction of the scanner module 40, that is, a direction of an arrow Y and including an original reading position 5 of the cover glass 41. Likewise, the light source 1 and a reflecting plate 2 are disposed approximately symmetrically sandwiching the vertical surface 30. The light source 1 and the reflecting plate 2 are placed oppositely to each other in the moving direction of the light source 1.

As in the case of a general fluorescent tube, the illuminant 21 is made of a light-transmissive material to prevent interference with irradiation of the original reading position 5. In addition, in this example, the illuminant 21 is disposed in a position not blocking light directed from the light source 1 and the reflecting plate 2 to the original reading position 5. Specifically, the illuminants 21 are disposed in positions outside a line P1 connecting the upper end of the reflecting plate 2 with the original reading position 5 and outside a line P2 connecting the original reading position 5 with the upper end of a phosphor 8.

With such a constitution, a part of ultraviolet rays 20a directly radiated from an opening 1B of the light source 1 and reflected by the reflecting plate 2 is reflected by the reflecting plate 2 and converted into visible light 13a by the illuminant 21. Then, the visible light 13a is transmitted through the glass plate 41 to irradiate the original reading position 5. Another part of the ultraviolet rays 20a is directly made incident onto the illuminant 21, converted into the visible light 13a, and transmitted through the glass plate 41 to irradiate the original reading position 5. Accordingly, also in this case, the ultraviolet rays 20a not directly used for reading can be effectively utilized, further enhancing an illumination effect and further reducing the ultraviolet rays 20a harmful to a line sensor. Moreover, since the illuminant 21 is a thin film formed on the backside of the glass plate 41 by application of paints, no obstacles are present to impede the disposition of the light source 1 close to the glass plate 41.

As shown in FIG. 7, the scanner module 40 includes the light source 1, the reflecting plate 2, mirrors 3a, 3b and 3c, a imaging lens 4, the line sensor 7, and so on. Usually used as a reading portion of a hand scanner, a digital copier or an image scanner, the scanner module 40 is manually moved in the direction of the arrow Y to perform reading of an original. The light source 1, the reflecting plate 2, the mirrors 3a, 3b and 3c, the imaging lens 4 and the line sensor 7 are formed in a unit.

Also, with such a constitution, since the illuminants 21 are formed on the backside of the glass plate 41, it is possible to place the light source 1 close to the original.

Figure 8:
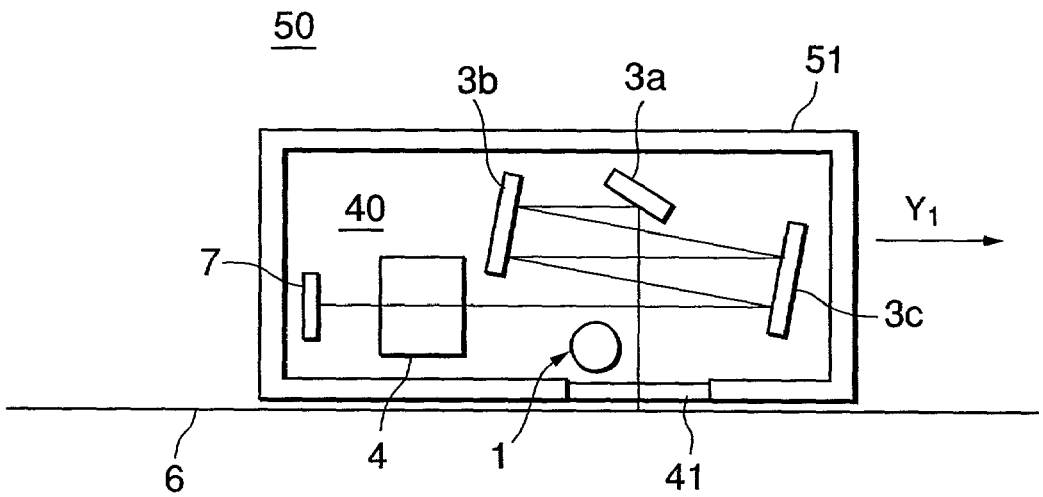
FIG. 8 is a sectional view showing an original reader of a sixth embodiment of the present invention which is used as a hand scanner.

FIG. 8 is a sectional view showing a sixth embodiment of the present invention.

In the embodiment, an example is shown in which the scanner module 40 shown in FIG. 7 is used as a hand scanner. Thus, the scanner module 40 including the light source 1, the reflecting plate 2, the mirrors 3a, 3b and 3c, the imaging lens 4, the line sensor 7, the cover glass 41, and so on, is housed in a case 51 to constitute a hand scanner 50. By manually moving this hand scanner 50 in a direction of an arrow Y1, reading of the original 6 is carried out.

Figure 9:
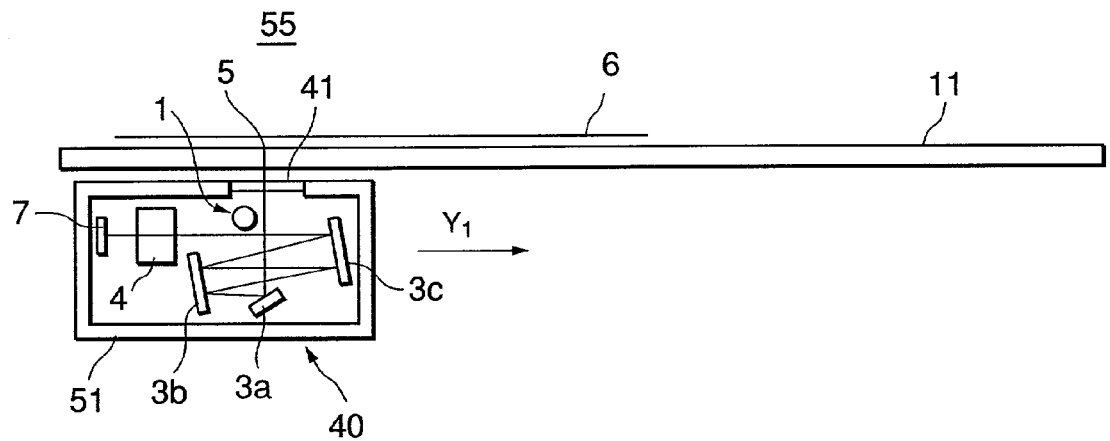
FIG. 9 is a sectional view showing an original reader of a seventh embodiment of the present invention which is used as an image scanner.
Figure 10:
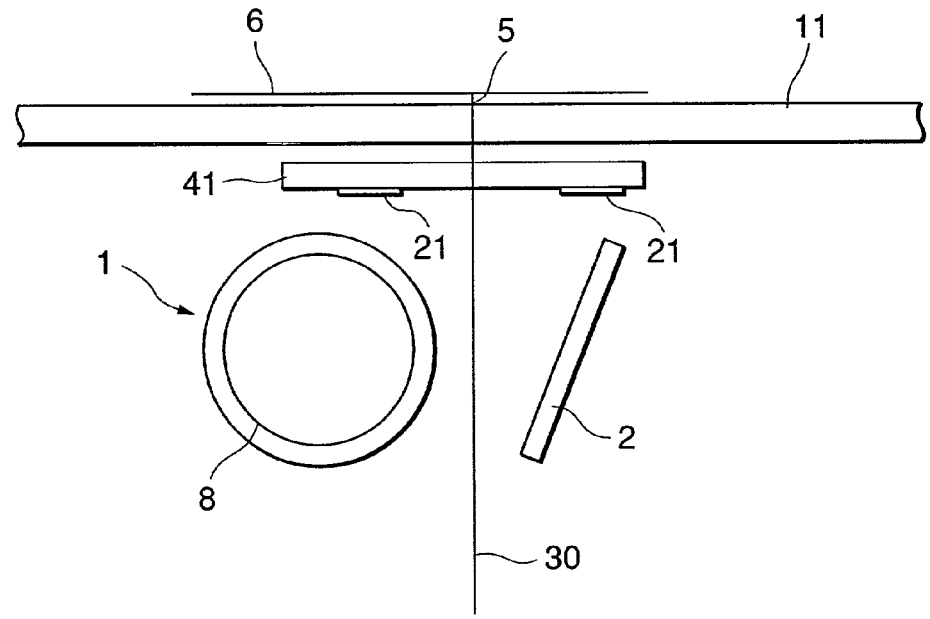
FIG. 10 is a sectional view showing a peripheral portion of a light source.
Figure 11:
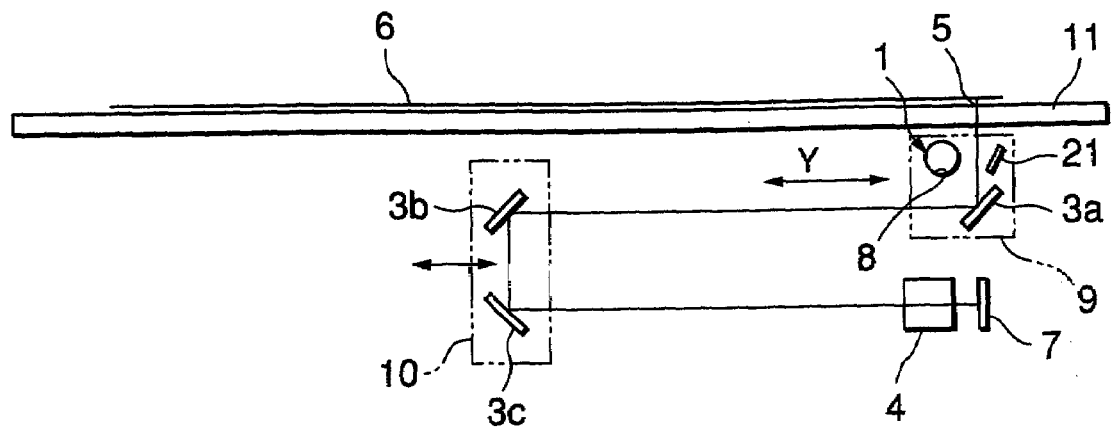
FIG. 11 is a constitutional view schematically showing a conventional original reader.

FIG. 9 is a sectional view showing a seventh embodiment of the present invention; and FIG. 10 is a sectional view showing a peripheral portion of a light source.

In the embodiment, an example is shown in which the scanner module 40 shown in FIG. 7 is used as an image scanner 55. Thus, the scanner module 40 including the light source 1, the reflecting plate 2, the mirrors 3a, 3b and 3c, the imaging lens 4, the line sensor 7, the cover glass 41, and so on, is housed in the case 51 and disposed in the backside of a glass plate 11 so as to be freely moved. Reading of an original is carried out by moving the scanner module 40 together with the case 51 in a direction of an arrow Y1 along the backside of the glass plate 11 by the driving of a driving motor. In this case, since the original reading position 5 is located on the surface of the glass plate 11, the cover glass 41 is also moved together with the light source 1.

Note that, the present invention is not limited to the foregoing embodiments and various changes and modifications can be made within the teachings of the present invention.

As apparent from the foregoing description, the original reader of the present invention is advantageous in the following respects. The light source and the illuminant are disposed in approximately symmetrical positions sandwiching the vertical surface orthogonal to the moving direction of the light source and including the original reading position; and the ultraviolet rays, directly radiated outside from the light source and not directly used for reading, are converted into the visible light by the illuminant. Thus, the illuminance at the original reading position can be increased and the illumination effect can be enhanced. Moreover, the ultraviolet rays harmful to the sensor can be reduced. Furthermore, since no obstacles are present between the light source and the original, the light source can be brought close to the original and brighter illumination can be achieved. As a result, it is possible to increase a reading speed, to improve S/N, and to enhance an image quality. If there is no need to increase the illuminance, a smaller light source can be used in an attempt to reduce costs for the light source.

By the use of the illuminant and the reflecting plate, brighter illumination can be provided and the illuminance distribution around the original reading position can be uniformized. As a result, compared with the conventional case, high installation accuracy of the light source is not necessary, and assembling and adjusting works are easier.

Furthermore, since the line sensor used for the color original reader shows various sensitivities for colors depending on quality thereof, it was usually necessary to match sensitivity with that of the line sensor at the light source side. According to the present invention, however, the selection of the color of light emitted from the external illuminant enables the most general light source to be used, reducing costs for the light source.

What is claimed is:

1. An original reader comprising:
    a light source for irradiating an original reading position;
    an illuminant for converting ultraviolet rays directly radiated outside from an opening of the light source into visible light; and
    a reflecting plate for reflecting light emitted from the light source and guiding the light to the original reading position,
    wherein said light source and said reflecting plate are disposed in approximately symmetrical positions sandwiching a vertical surface orthogonal to a moving direction of said light source and including said original reading position, and said illuminant is disposed in a side opposite to the original reading position such that said illuminant and said original reading position sandwich the light source.

2. The original reader according to claim 1, wherein another illuminant different from the illuminant placed oppositely to the original reading position is provided on a surface opposite to an original in an outer surface of a tube wall of the light source, both illuminants sandwiching the light source.

3. An original reader comprising:
    a light source for irradiating an original reading position;
    an illuminant for converting ultraviolet rays directly radiated outside from an opening of said light source into visible light; and
    a reflecting plate for reflecting light emitted from said light source and guiding the light to the original reading position,
    wherein said light source and said reflecting plate are disposed in approximately symmetrical positions sandwiching a vertical surface orthogonal to a moving direction of said light source and including said original reading position, and said illuminant is made of a light-transmissive material and provided on a backside of a glass plate on which an original is placed.

4. An original reader comprising:
    a case movable along an original and comprising a cover glass on a surface opposite to said original; and
    a scanner module housed in said case,
    wherein said scanner module comprises:
        a light source for irradiating an original reading position through said cover glass;
        illuminants for converting ultraviolet rays directly radiated outside from an opening of said light source into visible light;
        a reflecting plate for reflecting light emitted from said light source and guiding the light to the original reading position;
        a line sensor for reading said original;
        a mirror for guiding light reflected by said original to said line sensor through an imaging lens,
    said light source and said reflecting plate are disposed in approximately symmetrical positions sandwiching a vertical surface orthogonal to a moving direction of said light source and including said original reading position, and
    said illuminants are made of a light-transmissive material and provided on a backside of said cover glass in approximately symmetrical positions sandwiching said vertical surface.

* * * * *